United States Patent Office 3,210,410
Patented Oct. 5, 1965

3,210,410
ETHER DERIVATIVES OF N-ALKYLAMINO-
ALKANESULFONATE SALTS
Van R. Gaertner, Dayton, Ohio, assignor to Monsanto
Company, a corporation of Delaware
No Drawing. Filed Sept. 30, 1959, Ser. No. 843,352
8 Claims. (Cl. 260—509)

This invention relates to ether derivatives of N-alkylaminoalkanesulfonate salts. In one respect, this invention relates to N-alkylaminoalkanesulfonate salts substituted on the nitrogen atom with a polyether hydroxypropyl radical, as new compounds. In another aspect, this invention relates to methods for preparing said ether derivatives of N-alkylaminoalkanesulfonate salts from glycidyl ethers and N-alkylaminoalkanesulfonate salts. In another aspect, this invention relates to new surfactant compositions which are highly resistant to curd-forming ingredients of hard water. In another aspect, this invention relates to methods for increasing the lime soap dispersant efficiency of detergent compositions.

It is generally well known that soaps, e.g., the sodium, potassium and ammonium salts of fatty acids, precipitate as insoluble fatty acid salts, more commonly referred to as "lime soaps," in hard water or other water containing polyvalent metal ions such as calcium and magnesium ions. Such precipitated "lime soaps" have a tendency to coagulate and form undesirable curds, scums, films or deposits which are observed in the wash stand and bathtub and which stick to the clothes during the rinsing operation, thereby giving the clothes an unsightly, dingy appearance and a rancid odor. The formation of insoluble "lime soaps" also destroys or reduces the foaming and cleansing power of soap. It is desirable to develop compounds which are effective in dispersing insoluble "lime soaps" to thereby permit the unlimited use of water containing metal ions such as magnesium and calcium ions.

An object of this invention is to provide ether derivatives of N-alkylaminoalkanesulfonate salts as new compounds.

Another object of this invention is to provide methods for preparing ether derivatives of N-alkylaminoalkanesulfonate salts from glycidyl ethers and N-alkylaminoalkanesulfonate salts.

Another object of this invention is to provide new all-purpose soap compositions which form little or no insoluble "lime soap" curd when used with hard water.

Another object of this invention is to provide new surfactant compositions which are highly resistant to curd-forming ingredients of hard water.

Another object of this invention is to provide a method for increasing the lime soap dispersant efficiency of soap-containing detergent compositions to reduce the coagulation of precipitated "lime soap" in hard water and thereby prevent the formation of curd, scums, deposits, films and the like.

Other aspects, objects and advantages of this invention will be apparent from a consideration of the accompanying disclosure and the appended claims.

In accordance with this invention, a glycidyl ether is reacted with an N-alkylaminoalkenesulfonate salt to form N-substituted N-alkylaminoalkanesulfonate salts substituted on the N-atom thereof with an ether hydroxypropyl radical as illustrated by the following equation:

$$RO-[CH_2CHO]_x-CH_2CH\underset{O}{\overset{}{\diagdown\diagup}}CH_2 + R''NHCH-q-SO_3Z \longrightarrow$$
$$\underset{R'}{|} \qquad \underset{R'''}{|}$$

$$RO-[CH_2CHO]_x-CH_2CHCH_2-N-CH-q-SO_3Z$$
$$\underset{R'}{|} \qquad \underset{OH}{|} \quad \underset{R''}{|}\underset{R'''}{|}$$

wherein R is a radical selected from the group consisting of alkyl and alkaryl radicals having from 8 to 24 carbon atoms, R' is selected from the group consisting of hydrogen, lower alkyl radicals, chloromethyl radicals and hydroxymethyl radicals, said R' being the same or different when x is greater than 1, x is a whole number of from 1 to 10, R'' is an alkyl radical of from 1 to 4 carbon atoms, R''' is selected from the group consisting of hydrogen and alkyl radicals of from 1 to 2 carbon atoms, q is selected from the group consisting of $$-CH_2-, \ -CH_2CH_2-, \ -CH_2CH_2CH_2-$$

and $$-CH_2CH_2CH_2CH_2-$$

when R''' is hydrogen, q is selected from the group consisting of $-CH_2-$ and $-CH_2CH_2-$ when R''' is an alkyl radical of 1 carbon atom, q is $-CH_2-$ when R''' is an alkyl radical of 2 carbon atoms, and Z is a salt forming cation selected from the group consisting of alkali metal, alkaline earth metal, and ammonium.

Further, in accordance with the present invention, there are provided, as new compounds, aminoalkanesulfonate salts of the formula $$RO-[CH_2CHO]_x-CH_2CHCH_2-N-CH-q-SO_3Z$$
$$\underset{R'}{|} \qquad \underset{OH}{|} \quad \underset{R''}{|}\underset{R'''}{|}$$

wherein R, R', R'', R''', x, q, and Z are as above defined.

Further, in accordance with the present invention, there are provided new surface active compositions comprising, as the active ingredient, an aminoalkanesulfonate of the formula given above.

Further, in accordance with the present invention, there are provided new all-purpose detergent compositions comprising a sodium, potassium or ammonium salt of a long-chain fatty acid, and, as an essential ingredient, an aminoalkanesulfonate salt of the formula given above.

Further, in accordance with the present invention, there are provided methods for increasing the "lime soap" dispersant efficiency of soap-containing detergent compositions by adding an aminoalkanesulfonate salt of the formula given above to a sodium, potassium or ammonium long-chain fatty acid soap.

The glycidyl ethers which are useful for the preparation of the presently provided new compounds of my invention can be represented by the structural formula $$RO-[CH_2CHO]_x-CH_2CH\underset{O}{\overset{}{\diagdown\diagup}}CH_2$$
$$\underset{R'}{|}$$

wherein R, R' and x are as above defined.

The alkyl and alkaryl radicals defined by R have a total of at least 8 carbon atoms per molecule and may contain as many as 24 carbon atoms per molecule in either a straight-chain or a branched-chain arrangement. Illustrative examples of some alkyl radicals identified by R include the 2-ethylhexyl, isononyl, n-dodecyl, tert-dodecyl, 2-propylheptyl, 5-ethylnonyl, 2-butyloctyl, n-tetradecyl, n-pentadecyl, tert-octadecyl, 26,8-trimethylnonyl, and 7-ethyl-2-methyl-4-undecyl radicals. The alkyl radicals may also include unsaturated alkyl radicals such oleyl, dodecenyl, hexadecenyl, and the like. An especially valuable class of alkyl radicals is derived from an olefin monomer, dimer, trimer, tetramer, pentamer or the like, carbon monoxide and hydrogen according to the "Oxo" process. Such alkyl radicals include the branched-chain tridecyl radicals derived from propylene tetramer or butylene trimer, the branched-chain decyl radicals derived from propylene trimer, the branched-chain hexadecyl radicals derived from propylene pentamer, and the branched-chain nonyl radicals derived from diisobutylene. The alkaryl radicals, also defined by R, can include the monoalkylated as well as the polyalkylated aryl radicals. Illustrative examples of some alkaryl radicals which can be used include tert-octylphenyl, nonylphenyl, (2-ethylheptyl)phenyl, decylphenyl, 4-tert-dodecylphenyl, 2-tridecylphenyl, 3-tert-octadecylphenyl, 2-nonyl-1-naphthyl, 1-(2-butyloctyl)-2-naphthyl, 2,4-dimethylphenyl, 3-butylphenyl, and 2,4-dinonylphenyl radicals.

The lower alkyl radicals in the ether-substituted glycidyl ether identified in the formula above by R' are preferably the alkyl radicals containing less than 6 carbon atoms arranged in either straight-chain or branched-chain configuration. Illustrative examples of such alkyl radicals include methyl, ethyl, propyl, isopropyl, butyl, isobutyl, pentyl, hexyl, isohexyl, tert-butyl, 2-methylbutyl, 2,2-dimethylpropyl, and 2-methylpentyl radicals. When $x$ in the formula above is greater than 1, there are more than 1 of the radicals identified by R' and these radicals can be the same or different; that is, when $x$ is 2, there are two lower alkyl groups in the formula and each alkyl group can be, say, both methyl or both propyl, or one can be methyl and the other propyl, or one can be methyl and the other can be isobutyl, or the like. Also, when $x$ is greater than 1, R' can be both hydrogen and lower alkyl and/or chloromethyl and/or hydroxymethyl, depending upon the size of $x$.

As shown in the formula above for the ether-substituted glycidyl ether, the R' is attached to the 1-carbon atom, i.e., the carbon atom adjacent the oxygen atom of the ethenoxy group. However, the formation of the glycidyl ether usually results in the formation of some isomers wherein the R' is attached to the 2 carbon atom separated from the oxygen atom of the ethenoxy group by the methylene group, as follows:

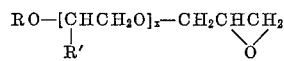

Although the predominant product is one in which the R' is attached to the carbon atom in the 1 position, it is also intended in this specification to include glycidyl ethers wherein the R' is attached to the carbon atom in the 2 position.

Similarly, R' is defined as being ether a chloromethyl or a hydroxymethyl radical even though the formation of the ether-substituted glycidyl ethers usually produces some products wherein a chloro group or a hydroxy group, instead of a chloromethyl group or a hydroxymethyl group, is attached to the carbon atom in the 2-position and the alkenoxy group is a propenoxy group as shown in the following formulas:

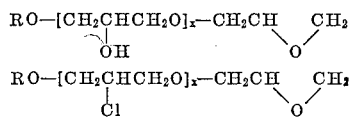

depending upon whether the chlorohydrin from which the glycidyl ether was made is a primary or a secondary alcohol group. Since the predominant product is the glycidyl ether having repeating ethenoxy groups with either chloromethyl or hydroxymethyl groups attached, only this structure is hereinafter referred to in this specification; however, it is intended that the structures shown above cover both configurations.

Thus, where $x$ is a whole number of 1 and R is an alkyl radical, the glycidyl ether is a 3-(2-alkoxyethoxy)-1,2-epoxypropane where R' is hydrogen; 3-(2-alkoxy-1-alkylethoxy)-1,2-epoxypropane where R' is alkyl; 3-(1-alkoxy-3-chloro-2-propoxy)-1,2-epoxypropane where R' is chloromethyl; and 3-(1-alkoxy-3-hydroxy-2-propoxy)-1,2-epoxypropane where R' is hydroxymethyl. Similarly, where $x$ is a whole number greater than 1 and R is an alkyl radical, the glycidyl ether is a 3-alkoxypoly(ethenoxy)-1,2-epoxypropane where R' is hydrogen; 3-alkoxypoly(alkenoxy)-1,2-epoxypropane where R' is alkyl 3-[1-alkoxypoly(3-chloro-2-propenoxy)] - 1,2 - epoxypropane where R' is chloromethyl; 3-[1-alkoxypoly(3-hydroxy-2-propenoxy)]-1,2-epoxypropane where R' is hydroxymethyl. Also, where $x$ is 1 and R is an alkaryl radical, the glycidyl ether is 3-alkaroxyethoxy-1,2-epoxypropane where R' is hydrogen; 3-(2-alkaroxy-1-alkylethoxy)-1,2-epoxypropane where R' is alkyl; 3-(1-alkaroxy-3-chloro-2-propoxy)-1,2-epoxypropane where R' is chloromethyl; and 3-(1-alkaroxy-3-hydroxy-2-propoxy)-1,2-epoxypropane where R' is hydroxymethyl. Furthermore, where $x$ is greater than 1 and R is an alkaryl radical the glycidyl ether is 3-alkaroxypoly(ethenoxy)-1,2-epoxypropane where R' is hydrogen; 3-alkaroxypoly(alkenoxy)-1,2-epoxypropane where R' is alkyl; 3-[1-alkaroxypoly(3-chloro-2 - propenoxy)] - 1,2 - epoxypropane where R' is chloromethyl and 3-[1-alkaroxypoly(3-hydroxy-2-propenoxy)] - 1,2 - epoxypropane where R' is hydroxymethyl.

Illustrative examples of some of these glycidyl ethers, are as follows:

3-(2-tert-octadecyloxyethoxy)-1,2-epoxypropane
3-(2-nonylphenoxyethoxy)-1,2-epoxypropane
3-[2-(2-propylheptyloxy)-1-propoxy]-1,2-epoxypropane
3-(2-n-hexadecyloxy-1-propoxy)-1,2-epoxypropane
3-(1-n-hexadecyloxy-3-chloro-2-propoxy)-1,2-epoxypropane
3-[2-(2,4-dinonylphenoxy)-1-butoxy]-1,2-epoxypropane
3-[1-(2,4-dinonylphenoxy)-3-chloro-2-propoxy]-1,2-epoxypropane
3-(2-n-hexadecyloxy-1-butoxy)-1,2-epoxypropane
3-(2-n-octadecyloxy-1-butoxy)-1,2-epoxypropane
3-[2-(2-butyloctyloxyethoxy)-ethoxy]-1,2-epoxypropane
3-[2-(2-decylphenoxyethoxy)-ethoxy]-1,2-epoxypropane
3-[1-(1-tridecyloxy-3-chloro-2-propoxy)-3-chloro-2-propoxy]-1,2-epoxypropane
3-[2-(2-n-hexadecyloxy-1-propoxy)-1-propoxy]-1,2-epoxypropane
3-[2-(2-n-octylphenoxy-1-hexoxy)-1-hexoxy]-1,2-epoxypropane
3-[2-(2-lauryloxy-1-butoxy)-1-butoxy]-1,2-epoxypropane
3-(2-ethylhexyloxy)tri(ethenoxy)-1,2-epoxypropane
3-(4-tert-dodecylphenoxy)tri(ethenoxy)-1,2-epoxypropane
3-[1-tert-dodecyloxytri(3-chloro-2-propenoxy)]-1,2-epoxypropane
3-[tert-dodecyloxytri(butenoxy)]-1,2-epoxypropane
3-[isononyloxyhexa(ethenoxy)]-1,2-epoxypropane
3-[(2-tridecylphenoxy)hexa(ethenoxy)]-1,2-epoxypropane
3-[n-pentadecyloxyhexa(pentenoxy)]-1,2-epoxypropane
3-[(3-butylphenovy)hexa(propenoxy)]-1,2-epoxypropane
3-[isodecyloxyhexa(propenoxy)]-1,2-epoxypropane The preparation of the ether-substituted glycidyl ethers is described in my copending application, Serial No. 843,353, filed September 30, 1959, now Patent No. 3,102,893, but this invention is not limited to the use of glycidyl ethers prepared according to that application and glycidyl ethers prepared by other methods can also be used in the process of the present invention. Thus, ether-substiutted glycidly ethers, including those where the alkylene oxide group is substituted with either a chloromethyl or a hydroxymethyl group, can be prepared from long-chain monohydric alcohols and glycidol, and/or epichlorohydrin using an acid-type catalyst such as boron trifluoride.

Instead of using the glycidyl ether compounds as reactants in this invention, the ether-substituted chlorohydrins from which the glycidyl ethers are obtained can be used as the reactant and the glycidyl ether formed in situ in the reaction zone in which the reaction with the N-alkylaminoalkanesulfonate salt takes place since the reaction of the glycidyl ether and the N-alkylaminoalkanesulfonate salt takes place in an alkaline solution. However, it is preferred to use a glycidyl ether reactant instead of the ether-substituted chlorohydrin because the alkali metal halide produced as a by-product in the glycidyl ether formation tends to cause the salting-out of the glycidyl ether in the reaction zone containing the N-alkylaminoalkanesulfonate salt reactant.

The N-alkylaminoalkanesulfonate salt reactants which are useful for the preparation of the presently provided new compounds of my invention can be represented by the formula $$R''NHCH\text{---}q\text{---}SO_3Z$$
$$\phantom{R''NHCH\text{---}q\text{---}SO_3}|$$
$$\phantom{R''NHCH\text{---}q\text{---}SO_3}R'''$$

wherein R″ is an alkyl radical preferably containing from 1 to 4 carbon atoms, R‴ is either hydrogen or an alkyl radical containing 1 or 2 carbon atoms, Z is a salt forming cation selected from the group consisting of alkali metal, alkaline earth metal, and ammonium, and q is

—CH$_2$—, —CH$_2$CH$_2$—, —CH$_2$CH$_2$CH$_2$—, or —CH$_2$CH$_2$CH$_2$CH$_2$— depending upon the nature of R‴. Thus, when R‴ is hydrogen, q is either —CH$_2$—, —CH$_2$CH$_2$—, —CH$_2$CH$_2$CH$_2$— or —CH$_2$CH$_2$CH$_2$CH$_2$— when R‴ is an alkyl radical of 1 carbon atom, q is either —CH$_2$— or —CH$_2$CH$_2$—; and when R‴ is an alkyl radical of 2 carbon atoms, q is —CH$_2$—. Thus the N-alkylaminoalkanesulfonate reactant must contain at least 2 carbon atoms in the alkane group and, preferably, fewer than 4 carbon atoms. The salt forming cation of the aminoalkanesulfonate reactant can be either an alkali metal, such as sodium, potassium or lithium; or an alkaline earth metal, such as calcium, strontium, barium, or magnesium; or an ammonium cation. The N-alkylaminoalkanesulfonate salt reactant must be in the form of a salt, substantially free of unneutralized sulfonic acid, because the reaction of this invention will not take place if the N-alkylaminoalkanesulfonate salt reactant is replaced by corresponding sulfonic acid.

Illustrative examples of some N-alkylaminoalkanesulfonate salt reactants which can be employed in this invention include the following:

Sodium N-methyl-2-aminoethanesulfonate or sodium N-methyltaurate
Sodium N-ethyl-2-aminoethanesulfonate
Potassium N-methyl-2-aminoethanesulfonate
Potassium N-propyl-2-aminoethanesulfonate
Sodium N-methyl-3-aminopropanesulfonate
Lithium N-butyl-3-aminopropanesulfonate
Sodium N-ethyl-3-aminobutanesulfonate
Barium N-isopropyl-4-aminobutanesulfonate
Calcium N-ethyl-2-aminoethanesulfonate
Calcium N-propyl-4-aminobutanesulfonate
Strontium N-methyl-3-aminopropanesulfonate
Ammonium N-methyl-2-aminoethanesulfonate
Ammonium N-isobutyl-3-aminopropanesulfonate
Sodium N-methyl-2-aminobutanesulfonate
Sodium N-ethyl-3-aminobutanesulfonate
Sodium N-methyl-2-aminopropanesulfonate Reaction of the glycidyl ether with the N-alkylaminoalkanesulfonate salt takes place readily by contacting the two reactants in a solvent or diluent at a moderately elevated temperature until the desired product has been formed. Although some reaction takes place at temperatures as low as 25° C., ordinarily a temperature above 60° C. is used. Preferably, the temperature is maintained less than 170° C. and the use of temperatures above 125° C. is not desirable where the product is to be used in detergent compositions since the more elevated temperatures appear to have a detrimental effect on the surfactant properties of the products.

Preferably, the reaction is carried out in a diluent or a solvent medium such as water, ethanol, dioxane, ether, and the like. Water is the preferred solvent, particularly since the N-alkylaminoalkanesulfonate salt is usually available in an aqueous solution, although very good yields are obtained when a mixture of water and one of the other solvents, such as ethanol, is used. In any case, the solvent should be one in which the N-alkylaminoalkanesulfonate salt is soluble.

Ordinarily, the reaction of this invention is conducted at atmospheric pressure but either subatmospheric or superatmospheric pressures can be used.

The glycidyl ether and the N-alkylaminoalkanesulfonate salt reactants are preferably reacted in approximately stoichiometric proportions; however, a moderate excess of the N-alkylaminoalkanesulfonate salt can be used. It is not desirable to use an excess of the glycidyl ether reactant because this reactant is not readily separated from the product and glycidyl ether is detrimental to the use of the product in detergent compositions.

The reaction of the glycidyl ether with the N-alkylaminoalkanesulfonate salt is primarily an addition type reaction resulting in the formation of a single product. The product is very readily recovered from the reaction mixture, particularly when the reaction was conducted in a solvent medium in which the reactants are soluble, by the usual isolating procedures. If no excess reagents are present in the reaction mixture, the product is readily recovered by merely volatilizing off the water and any solvent which may be present by raising the temperature and reducing the pressure. If oily by-products are present in the reaction mixture, these materials are first removed by distillation with them and the resulting reaction mixture is then dried by stripping off the water at reduced pressure while replacing it with isopropanol in which the product is substantially soluble at elevated temperatures. Then the insoluble materials are separated by filtration at elevated temperature and the product crystallized from the filtrate by cooling. The product is finally recovered by filtration of the cooled isopropanol filtrate or by evaporation of the isopropanol, preferably under reduced pressure.

The complex ether-substituted N-alkylaminoalkanesulfonate salt obtained as a product in the process of this invention is an N-[3-(2-alkoxyethoxy)-2-hydroxy-1-propyl]-N-alkylaminoalkanesulfonate salt where $x$ is a whole number of 1, R is an alkyl and R′ is hydrogen; for example, sodium N-[3-(2-tert-octadecyloxyethoxy)-2-hydroxy-1-propyl]-N-methyl-2-aminoethanesulfonate or potassium N-[3-(2-octyloxyethoxy)-2-hydroxy-1-propyl]-N-methyl-2-aminobutanesulfonate. Where $x$ is a whole number of 1, R is an alkyl and R′ is an alkyl, the product is an N-[3-(2-alkoxy-1-alkylethoxy)-2-hydroxy-1-propyl]-N-aminoalkanesulfonate salt, e.g., lithium N-[3-(2-n-hexadecyloxy-1-propoxy)-2-hydroxy-1-propyl]-N-methyl-3-aminopropanesulfonate or calcium N-[3-(2-n-hexadecyloxy-1-butoxy)-2-hydroxy-1-propyl]-N-ethyl-3-aminobutanesulfonate. Where $x$ is a whole number of 1, R is an alkyl and R′ is chloromethyl, the product is an N-[3-(1-alkoxy-3-chloro-2-propoxy)-2-hydroxy-1-propyl]-N-alkylaminoalkanesulfonate salt, e.g., sodium N-[3-(1-n-octadecyloxy-3-chloro-2-propoxy)-2-hydroxy-1-propyl]-N-ethyl-4-aminobutanesulfonate. Where $x$ is a whole number of 1, R is an alkyl and R′ is hydroxymethyl, the product is an N-[3-(1-alkoxy-3-hydroxy-2-propoxy)-2-hydroxy-1-propyl]-N-alkylaminoalkanesulfonate salt, e.g., potassium N-[3-(1-octyloxy-3-hydroxy-2-propoxy)-2-hydroxy-1-propyl]-N-propyl-4-aminobutanesulfonate.

Where $x$ is a whole number of 1, R, is an alkaryl, and R′ is hydrogen, the product is an N-[3-(2-alkaroxyethoxy)-2-hydroxy-1-propyl]-N-alkylaminoalkanesulfonate salt, e.g., sodium N-{3-[2-(2,4-dinonylphenoxyethoxy)]-2-hydroxy-1-propyl}-N-methyl-3-aminopropanesulfonate or calcium N-[3-(2-nonylphenoxyethoxy)-2-hydroxy-1-propyl]-N-methyl-2-aminobutanesulfonate. Where $x$ is a whole number of 1, R is an alkaryl and R′ is an alkyl, the product is an N-[3-(2-alkaroxy-1-alkylethoxy)-2-hydroxy-1-propyl]-N-alkylaminoalkanesulfonate salt, e.g., sodium N - {3 - [2-(2,4-dihexylphenoxy)-1-butoxy]-2-hydroxy-1-propyl}-N-ethyl-3-aminobutanesulfonate. Where $x$ is a whole number of 1, R is an alkaryl and R' is chloromethyl, the product is an N-[3-(1-alkaroxy-3-chloro-2-propoxy) - 2-hydroxy-1-propyl]-N-alkylaminoalkanesulfonate salt, e.g., potassium N-[3-(1-hexylphenoxy-3-chloro-2-propoxy) - 2-hydroxy-1-propyl]-N-methyl-2-aminoethanesulfonate. Where $x$ is a whole number of 1, R is an alkaryl and R' is hydroxymethyl, the product is an N-[3-(1 - alkaroxy-3-hydroxy-2-propoxy)-2-hydroxy-1-propyl]-N-alkylaminoalkanesulfonate salt, e.g., lithium N-{3-[1, 2,4 - dioctylphenoxy)-3-hydroxy-2-propoxy]-2-hydroxy-1-propyl}-N-ethyl-4-aminobutanesulfonate.

The complex ether-substituted N-alkylaminoalkanesulfonate salt obtained as a product in the process of this invention is an N-{3-[alkoxypoly(ethenoxy)]-2-hydroxy-1-propyl}-N-alkylaminoalkanesulfonate salt where $x$ is a whole number greater than 1, R is an alkyl and R' is hydrogen; for example, sodium N-{3-{2-[2-(2-butyloctyloxy)ethoxy] - ethoxy}-2-hydroxy-1-propyl}-N-propyl-4-aminobutanesulfonate, lithium N-{3-[(2-ethylhexyloxy)-tri(ethenoxy)] - 2-hydroxy-1-propyl}-N-methyl-2-aminoethanesulfonate, or magnesium N-{3-[isononyloxyhexa(ethenoxy)] - 2 - hydroxy-1-propyl}-N-methyl-3-aminopropanesulfonate. Where $x$ is a whole number greater than 1, R is an alkyl and R' is an alkyl, the product is an N - [3-alkoxypoly(alkenoxy)-2-hydroxy-1-propyl]-N-alkylaminoalkanesulfonate salt, e.g., sodium N-{3-[2-(2-tridecyloxy - 1 - propoxy)-1-propoxy]-2-hydroxy-1-propyl} - N-ethyl-4-aminobutanesulfonate, potassium N-[3-tert - dodecyloxytri(hexenoxy) - 2-hydroxy-1-propyl]-N-methyl-2-aminobutanesulfonate, or potassium N-[3-n-pentadecyloxyhexa(pentenoxy) - 2-hydroxy-1-propyl]-N-propyl-4-aminobutanesulfonate. Where $x$ is a whole number greater than 1, R is an alkyl and R' is chloromethyl, the product is an N-{3-[1-alkoxypoly(3-chloro-2-propenoxy)] - 2 - hydroxy-1-propyl}-N-alkylaminoalkanesulfonate salt, e.g., sodium N-{3-[1-(1-n-hexadecyloxy-3-chloro - 2 - propoxy)-3-chloro-2-propoxy]-2-hydroxy-1-propyl}-N-ethyl-3-aminobutanesulfonate or lithium N-{3-[1-isodecyloxyhexa(3 - chloro-2-propenoxy)]-2-hydroxy-1-propyl}-N-methyl-2-aminoethenesulfonate. Where $x$ is a whole number greater than 1, R is an alkyl and R' is hydroxy-methyl, the product is N-{3-[1-alkoxypoly(3-hydroxy - 2-propenoxy)]-2-hydroxy-1-propyl}-N-alkylaminoalkanesulfonate salt, e.g., potassium N-{3-[1-(1-lauryloxy - 3-hydroxy-2-propoxy)-3hydroxy-2-propoxy]-2-hydroxy - 1-propyl}-N-methyl-3-aminopropanesulfonate or calcium N-{3- [1-n-pentadecyloxyhexa(3-hydroxy-2-propenoxy)] - 2-hydroxy-1-propyl}-N-methyl-2-aminobutanesulfonate.

Where $x$ is a whole number greater than 1, R is an alkaryl and R' is hydrogen, the product is an N-{3-[alkaroxypoly(ethenoxy)] - 2 - hydroxy-1-propyl}-N-alkylaminoalkanesulfonate salt, e.g., sodium N-{3-[2-(2-dodecylphenoxy)ethoxy] - 2-hydroxy-1-propyl}-N-methyl-2-aminoethanesulfonate, potassium N-{3-[2-tert-dodecylphenoxytri(ethenoxy)] - 2-hydroxy-1-propyl}-N-propyl-4-aminobutanesulfonate, - or magnesium N-{3-[2-(2-tridecylphenoxy) - hexa(ethenoxy)]-2-hydroxy-1-propyl}-N-ethyl-4-aminobutanesulfonate. Where $x$ is a whole number greater than 1, R is an alkaryl, and R' is an alkyl, the product is an N-[3-alkaroxypoly(alkenoxy)-2-hydroxy-1-propyl]-N-alkylaminoalkanesulfonate salt, e.g., sodium N-{3-{2-[2-(2-ethylheptyl)phenoxy-1-hexoxy} - 2-hydroxy-1-propyl}-N-ethyl-3-aminobutanesulfonate, lithium N-[3-(2-tridecyl)phenoxytri(hexenoxy)-2 - hydroxy - 1-propyl]-N-methyl-3-aminopropanesulfonate, or ammonium N-[3-(3-butylphenoxy)hexa(propenoxy) - 2-hydroxy-1-propyl]-N-methyl-2-aminobutanesulfonate. Where $x$ is a whole number greater than 1, R is an alkaryl, and R' is chloromethyl, the product is an N-{3 - [1-alkaroxypoly(3-chloro-2-propenoxy)]-2-hydroxy-1-propyl}-N-alkylaminoalkanesulfonate salt, e.g., potassium N-{3-{1-[1-(2-ethylheptyl)phenoxy)-3-chloro-2-propoxy] - 3 - chloro - 2 - propoxy}-2-hydroxy-1-propyl}-N-methyl-3-aminopropanesulfonate or lithium N-{3-[1-(3-butylphenoxy)hexa(3 - chloro-2-propenoxy)]-2-hydroxy-1-propyl}-N-methyl-2-aminobutanesulfonate. Where $x$ is a whole number greater than 1, R is an alkaryl and R' is hydroxymethyl, the product is an N-{3-[1-alkaroxypoly(3 - hydroxy - 2-propenoxy)]-2-hydroxy-1-propyl}-N-alkylaminoalkanesulfonate salt, e.g., sodium N-{3-[1-(3-butyl)phenoxytri(3 - hydroxy-2-propenoxy)]-2-hydroxy-1-propyl}-N-ethyl-4-aminobutanesulfonate.

The complex ether-substituted N-alkylaminoalkanesulfonate salts of this invention are stable, usually water soluble, friable solids or viscous liquids which vary in color from light yellow to amber. They are valuable articles of commercial interest and have many varied uses, particularly as surface active agents. They can be used as wetting, frothing or washing agents in the treatment and processing of textiles, for dyeing, for pasting of dyestuffs, fulling, sizing, impregnating and bleaching, and the like. In addition, these compounds are useful for preparing foam in fire extinguishers, for use as froth flotation agents, as air entraining agents for concrete or cement, and as aids in the preparation of other articles of commerce. These complex ether-substituted N-alkylaminoalkanesulfonate salts are particularly useful in soap and synthetic detergent compositions as lime soap dispersants.

The advantages, the desirability and usefulness of the present invention will be illustrated by the following examples.

*Example 1*

In this example, a glycidyl ether prepared from a mixture of saturated fatty alcohols having an average molecular weight of about 258, corresponding to a mixture of $C_{16}$ and $C_{18}$ saturated fatty alcohols, and marketed by Archer-Daniels-Midland Company as Adol 65, and approximately 1 mole of butylene oxide per mole of the Adol 65 alcohol was reacted with N-methyltaurine sodium salt, i.e., N-methyl-2-aminoethanesulfonate. In a reaction flask were placed 41.8 g. (0.10 mole) of the glycidyl ether and 27 g. of a 65% aqueous N-methyltaurine sodium salt solution (corresponding to 0.11 mole of the taurinate). No additional diluent was used, the amount of water in the N-methyltaurine solution being sufficient for the reaction. The reaction flask was then heated with stirring for a period of 2 hours while maintaining the temperature at 120–130° C. At the end of this time, most of the water was removed from the reaction mixture by distillation. The resulting residue was further dried by stripping off the remaining water at reduced pressure while replacing it with isopropanol. The isopropanol was then removed by evaporation to obtain a light yellow colored gum which is sodium N-[3-(1-alkoxy-2-butoxy) - 2 - hydroxy - 1 - propyl]-N-methyl - 2 - aminoethanesulfonate wherein the alkoxy is derived from a mixture of $C_{16}$ and $C_{18}$ saturated fatty alcohols.

*Example 2*

In this example, sodium N-{3-[1-(n-hexadecyloxy-2-propoxy) - 2 - propoxy]-2-hydroxy - 1 - propyl}-N-methyl-2-aminoethanesulfonate was prepared from the glycidyl ether, 3-[1-(n-hexadecyloxy-2-propoxy)-2-propoxy]-1,2-epoxypropane and N-methyltaurine sodium salt. In a reaction flask were placed 20.7 g. of the glycidyl ether (0.05 mole) and 13.5 g. of a 65% aqueous N-methyltaurine sodium salt solution (corresponding to 0.055 mole of the taurinate). These reactants were then heated with stirring during ten minutes to a temperature of 122° C. At the end of this time, by-products were removed from the reaction product by steam distillation and the water was removed by stripping under reduced pressure with the periodic addition of isopropanol. The isopropanol was then evaporated to obtain the sodium N-{3-[1-(n-hexadecyloxy - 2 - propoxy) - 2 - propoxy]-2-hydroxy-1- propyl}-N-methyl-2-aminoethanesulfonate which is a cream-colored gum.

Example 3

In this example, a glycidyl ether prepared from a mixture of saturated fatty alcohols having a 90% boiling point of 264–322° C. at 760 mm., corresponding to 61.0% lauryl alcohol, 23.0% myristyl alcohol and 11.2% cetyl alcohol, and marketed by E. I. du Pont de Nemours and Company as Lorol 5, and approximately 3 mols of epichlorohydrin per mole of the Lorol 5 alcohol was reacted with N-methyltaurine sodium salt. Into a reaction flask were placed 42.7 g. (0.10 mole) of the glycidyl ether and 27.2 g. of a 65% aqueous N-methyltaurine sodium salt solution (corresponding to 0.110 mole of active ingredient). The reaction flask containing these reactants was heated with stirring for a period of 2 hours while maintaining the temperature at 100–105° C. At the end of this time, 100 ml. of isopropanol was added to the reaction mixture which was then cooled with the formation of two layers. The water in the reaction mixture was then removed by stripping under reduced pressure with the periodic addition of isopropanol. The hot isopropanol solution remaining was cooled and formed two layers and the upper layer was removed by decantation; it contained some oily impurities. This process was repeated with fresh isopropanol. The isopropanol was then removed from the lower layer by evaporation to leave as residue 44.0 g. of the sodium N-{3-[1-(1-alkoxy-3-chloro-2-propoxy)-3-chloro-2-propoxy]-2-hydroxy-1-propyl}-N-methyl-2-aminoethanesulfonate as product, the alkoxy being derived from the saturated fatty alcohols in the Lorol 5. The product was a light amber-colored gum.

Example 4

In this example, sodium N-{3-[1-decyloxyhexa(2-propenoxy)]-2-hydroxy-1-propyl}-N-methyl-2-aminoethanesulfonate was prepared from the glycidyl ether, 3-[1-decyloxyhexa(2-propenoxy)]-1,2-epoxypropane, and N-methyltaurine sodium salt. The decyl radical of the glycidyl ether was derived from decanol obtained from the "Oxo" process using propylene trimer as the olefin. Into a reaction flask were placed 29.1 g. (0.050 mole) of the glycidyl ether and 13.5 g. of 65% aqueous N-methyltaurine sodium salt solution (corresponding to 0.055 mole of active ingredient). The reaction flask was heated with stirring for a period of 10 minutes with the temperature being permitted to reach 185° C. At the end of this time, oily by-products were removed by steam distillation. The water was then removed by aspiration at a temperature of 150° C. and the residue remaining was completely dried by stripping off the remaining water under reduced pressure while periodically adding isopropanol. Then the isopropanol was removed by evaporation to obtain 36.5 g. of the sodium N-{3-[1-decyloxyhexa(2-propenoxy)]-2-hydroxy-1-propyl}-N-methyl-2-aminoethanesulfonate.

Example 5

In this example, a glycidyl ether prepared from Lorol 5 and 4 moles of epichlorohydrin per mole of the Lorol 5 alcohol was reacted with N-methyltaurine sodium salt. Into a reaction flask were placed 52.0 g. (0.100 mole) of the glycidyl ether and 27 g. of 65% aqueous N-methyltaurine sodium salt solution (corresponding to 0.110 mole of active ingredients). The reactants were then heated with stirring at a temperature of 105–120° C. for a period of 30 minutes. At the end of this time, oily by-products were removed by steam distillation at a temperature of 120–140° C. and some excess water was removed by distillation. The residue was then dried by replacing the remaining water with isopropanol while distilling under reduced pressure. The isopropanol was then removed by evaporation at 120° C. to obtain sodium N-{3-[1-alkoxytri(3-chloro-2-propenoxy)]-2-hydroxy-1-propyl}-N-methyl-2-aminoethanesulfonate, the alkoxy being derived from the saturated fatty alcohols of Lorol 5. This product was a very light colored gum which becomes fluid when heated.

Example 6

In this example, sodium N-{3-[1-tridecyloxytri(3-chloro-2-propenoxy)]-2-hydroxy-1-propyl}-N-methyl-2-aminoethanesulfonate was prepared from 3-[1-tridecyloxytri(3-chloro-2-propenoxy)]-1,2-epoxypropane and N-methyltaurine sodium salt. The branched-chain tridecyl radical was derived from branched-chain tridecyl alcohol prepared according to the "Oxo" process using propylene tetramer as the olefin. In a reaction flask were placed 26.7 g. (0.050 mole) of the glycidyl ether and 13.5 g. of a 65% aqueous N-methyltaurine sodium salt solution (corresponding to 0.055 mole of active ingredient). The reaction flask containing the reactants was then heated in an oil bath at a temperature of 120–140° C. for a period of 1 hour. At the end of this time, the reaction product was steam distilled to remove oily by-products and the residue was then aspirated at 140° C. to remove some excess water. The partially dried material was then further dried by stripping the water under reduced pressure while replacing it with isopropanol. The isopropanol was then removed by evaporation to obtain sodium N-{3-[1-tridecyloxytri(3-chloro-2-propenoxy)]-2-hydroxy-1-propyl}-N-methyl-2-aminoethanesulfonate which is an amber-colored gum.

Example 7

In this example, a glycidyl ether prepared from Adol 65 and 3 moles of epichlorohydrin per mole of Adol 65 alcohol was reacted with N-methyltaurine sodium salt to form sodium N-{3-[1-(1-alkoxy-3-chloro-2-propoxy)-3-chloro-2-propoxy]-2-hydroxy-1-propyl}-N-methyl-2-aminoethanesulfonate. In a reaction flask were introduced 49.9 g. (0.10 mole) of the glycidyl ether and 27 g. of 65% aqueous N-methyltaurine sodium salt solution (corresponding to 0.11 mole of the active ingredient). The reaction flask was heated for a period of 30 minutes while maintaining the temperature at approximately 130° C. The reaction product was then steam distilled at 130–150° C. to remove oily by-products. The excess water was then removed by distillation and the residue was dried by stripping out the remaining water under reduced pressure while replacing it with isopropanol. Upon cooling the isopropanol solution, the product separated out and was recovered by decantation of the isopropanol. The recovered product was dried at 145° C. at the aspirator vacuum to produce 33.2 g. of the sodium N-{3-[1-(1-alkoxy-3-chloro-2-propoxy)-3-chloro-2-propoxyl-2-hydroxy-1-propyl}-N-methyl-2-aminoethanesulfonate which is amber-colored gum.

Example 8

In this example, a glycidyl ether prepared from Lorol 5 and 2 moles of butylene oxide per mole of Lorol 5 alcohol were reacted with N-methyltaurine sodium salt to form sodium N-{3-[1-(1-alkoxy-2-butoxy)-2-butoxy]-2-hydroxy-1-propyl}-N-methyl-2-aminoethanesulfonate, wherein the alkoxy radical is derived from the saturated fatty alcohols of the Lorol 5. Into the reaction flask were introduced 40.5 g. (0.10 mole) of the glycidyl ether and 27 g. of 65% aqueous N-methyltaurine sodium salt solution (corresponding to 0.110 mole of active ingredient). The reaction flask was heated with stirring at a temperature of 115–127° C. for a period of 1 hour and 20 minutes. At the end of this time, the reaction product was steam distilled at a temperature of 110–125° C. to remove oily by-products. The reaction product was then aspirated to remove excess water and dried by stripping the remaining water under reduced pressure while replacing it with isopropanol. The isopropanol was then removed by evaporation to leave the sodium N-{3-[1-(1-alkoxy-2-butoxy)-2-butoxy]-2-hydroxy-1-propyl}-N-methyl-2-aminoethanesulfonate, which is a light amber-colored gum.

Example 9

In this example, a glycidyl ether prepared from Adol 62, which is mostly n-octadecanol, marketed by Archer-Daniels-Midland Company, and 2 moles of epichlorohydrin per mole of octadecanol was reacted with N-methyltaurine sodium salt to produce sodium N-[3-(1-n-octadecyloxy-3-chloro-2-propoxy)-2-hydroxy-1-propl] - N - methyl-2-aminoethanesulfonate. Into a reaction flask were introduced 29.4 g. (0.070 mole) of the glycidyl ether and 18.2 g. of 65% aqueous N-methyltaurine sodium salt solution (corresponding to 0.074 mole of the active ingredient). The reaction flask was heated with stirring at a temperature between 80° C. and 110° C. for a period of 2 hours and 15 minutes. At the end of this time, the reaction product was steam distilled at a temperature of 120–160° C. to remove oily by-products. The excess water was removed from the residue by aspiration at a temperature of 160° C. The remaining water was then removed by stripping under reduced pressure while periodically adding isopropanol. The isopropanol was then removed by aspiration at a temperature of 150° C. to leave the sodium N-[3-(1-n-octadecyloxy-3-chloro-2-propoxy)-2-hydroxy-1-propyl]-N-methyl- 2 - aminoethanesulfonate which is a cream-colored brittle solid.

Example 10

In this example, sodium N-(3-{1-[1-(dodecylphenoxy)-2-butoxy]-2-butoxy} - 2 - propoxy} - 2 - hydroxy-1-propyl)-N-methyl-2-aminoethanesulfonate was prepared from 3-{1-{1-[1-(dodecylphenoxy) - 2 - butoxy]-2-butoxy}-2-propoxy}-1,2-epoxypropane and N-methyltaurine sodium salt. In a reaction flask were placed 57.7 g. (0.10 mole) of the glycidyl ether and 27.2 g. of a 65° aqueous N-methyltaurine sodium salt solution (corresponding to 0.11 mole of taurinate). The reaction flask containing the reactants was then heated at a temperature in the range of 98° C. to 117° C. for a period of 50 minutes. At the end of this time, the viscous, gummy reaction product was taken up in isopropanol and then dried by stripping off the water under reduced pressure while replacing it with isopropanol. The isopropanol was removed by evaporation to leave 66.7 g. of sodium N-(3-{1-{1-[1-(dodecylphenoxy)-2-butoxy] - 2 - butoxy}-2-propoxy}-2-hydroxy-1-propyl)-N - methyl - 2 - aminoethanesulfonate which is a hard, light colored gum.

Example 11

In this example, sodium N-[3-(3-tridecyloxy-2-hydroxy-1-propoxy) - 2 - hydroxy - 1-propyl]-N-methyl-2-aminoethanesulfonate was prepared from 3-(3-tridecyloxy-2-hydroxy-1-propoxy)-1,2-epoxypropane and N-methyltourine sodium salt. In a reaction flask were placed 12.9 g. (0.050 mole) of the glycidyl ether and 13.6 g. of a 65% aqueous N-methyltaurine sodium salt solution (corresponding to 0.055 mole of the taurinate). The reaction flask containing the reactants was then heated on an oil bath with stirring for a period of 30 minutes at a temperature of 100–105° C. At the end of this time, the reaction product was dried by stripping off the water under reduced pressure and replacing it with isopropanol. Then, the isopropanol was removed by evaporation leaving 27.0 g. of the sodium N-[3 - (3 - tridecyloxy-2-hydroxy-1-propoxy)-2-hydroxy-1-propyl]-N-methyl-2-aminoethanesulfonate which is an amber-colored hard gum.

Example 12

In this example, the lime soap dispersion efficiencies of a number of the new ether-substituted N-alkylaminoalkane salts of this invention were determined using the procedure described by J. C. Harris in ASTM Bulletin 140, pp. 1–13, May 1946. These results are reported in the table below wherein the dispersion number is equal to 10 times the milliliters of the test compound required to disperse 45.5 milligrams of calcium oleate formed.

| Compound: | Dispersion number |
|---|---|
| Compound of Example 1 | 20 |
| Compound of Example 2 | 40 |
| Compound of Example 3 | 20 |
| Compound of Example 4 | 40 |
| Compound of Example 5 | 40 |
| Compound of Example 6 | 10 |
| Compound of Example 7 | 10 |
| Compound of Example 8 | 10 |
| Compound of Example 9 | 60 |
| Compound of Example 10 | 80 |

Example 13

The wetting efficiencies of the compounds of Examples 4, 6 and 8 were determined by the Draves Wetting Test of the American Association of Textile Chemists. The following wetting times were measured at the concentrations shown:

| Compound | Time in seconds | | | | | |
|---|---|---|---|---|---|---|
| | 0.5% | 0.25% | 0.125% | 0.062% | 0.031% | 0.015% |
| Compound of Example 4 | 2.2 | 4.9 | 9.0 | 22.4 | 175.0 | +180 |
| Compound of Example 6 | 18.9 | 25.4 | 43.5 | 112.1 | +180 | |
| Compound of Example 8 | 23.9 | 35.0 | 56.5 | 88.9 | +180 | |

Example 14

The detergency properties of the compounds of Examples 2, 3 and 4 were measured by employing the method described by J. C. Harris and E. L. Brown in the Journal of the American Oil Chemists Society, 27, 135–143 (1950). In this method, the detergency of the candidate compound was compared with the detergency of Gardinol WA, a commercial detergent produced by sulfating the mixture of alcohols, principally $C_{12}$ obtained by hydrogenating coconut oil fatty acids. The following detersive efficiencies were measured:

| Compound | 50 p.p.m. water hardness | 300 p.p.m. water hardness |
|---|---|---|
| Compound of Example 2 | 49 | 109 |
| Compound of Example 3 | 91 | 107 |
| Compound of Example 4 | 110 | 114 |

Using the detergency evaluation procedure noted above, the detergency of "built" materials using the compounds of Examples 3 and 4 were determined. The products were formulated by using 15% of the "active" surfactant with the balance of the formulation being composed of sodium tripolyphosphate, sodium tetrapyrophosphate, sodium silicate and soda ash. The following results were obtained:

| Compound | 50 p.p.m. water hardness | 300 p.p.m. water hardness |
|---|---|---|
| Compound of Example 3 | 92 | 99 |
| Compound of Example 4 | 98 | 91 |

Example 15

Compounds of Examples 5, 6 and 8 were evaluated with respect to lathering activity as determined by the Ross-Miles Lathering Test of the American Society for Testing Materials. In the following results, the lather heights were measured in centimeters in water of 50 p.p.m. and 300 p.p.m. hardness.

| Compound | 50 p.p.m. water hardness | | 300 p.p.m. water hardness | |
|---|---|---|---|---|
| | At once | 5 min. | At once | 5 min. |
| Compound of Example 5 | 16.3 | 16.3 | 10.6 | 10.6 |
| Compound of Example 6 | 17.9 | 17.9 | 13.1 | 12.9 |
| Compound of Example 8 | 17.1 | 15.7 | 14.7 | 13.7 |

As surface active compositions, the ether-substituted N-alkylaminoalkanesulfonate salts of this invention comprise either the pure compounds or an admixture of the pure compounds with an adjuvant or diluent. Ordinarily, the compounds of this invention are employed in surface active applications in a diluted form where the compound is dissolved or suspended in some liquid medium such as water. The compounds of this invention can also be admixed with adjuvant materials, particularly when used in soap or synthetic detergent compositions, such as common inorganic builders of the type such as carbonates, phosphates, silicates, and fillers.

The new ether-substituted N-alkylaminoalkane sulfonate salts of this invention are particularly useful in soap and synthetic detergent compositions because these compounds possess unusually high "lime soap" dispersion properties. The relative proportions of the ether-substituted N-alkylaminoalkane sulfonate salts of this invention and the soap and/or synthetic detergent in the new compositions may vary greatly, depending upon the use intended for the compositions. Although useful detergent compositions can be formed by mixing small proportions of soap with large proportions of the ether-substituted N-alkylaminoalkanesulfonate salts of this invention, usually the greatest value of soap compositions of the present invention lie in composition having less than 75% by weight of the ether-substituted N-alkylaminoalkanesulfonate salts. In general, it is preferred to incorporate into the soap composition about 5–50% by weight of the ether-substituted N-alkylaminoalkanesulfonate salt based on the total weight of the soap and the ether-substituted N-alkylaminoalkanesulfonate salt. Of course, other materials such as perfumes, fillers, and inorganic builders of the type such as carbonates, phosphates and silicates can also be present in the composition.

The soaps which are useful in the novel compositions of this invention are the so called water-soluble soaps of the soap-making art and include sodium, potassium, ammonium and amine salts of the higher fatty acids, that is, those having about 8 to 20 carbon atoms per molecule. These soaps are normally prepared from such naturally-occurring esters as coconut oil, palm oil, olive oil, cottonseed oil, tung oil, corn oil, castor oil, soybean oil, wood fat, tallow, whale oil, menhaden oil, and the like, as well as mixtures of these.

Reasonable variation and modification of the invention as described are possible, the essence of which is that there have been provided (1) methods for preparing ether-substituted N-alkylaminoalkanesulfonate salts from glycidyl ethers and N-alkylaminoalkanesulfonate salts, (2) said ether-substituted N-alkylaminoalkanesulfonate salts as new compounds, (3) said ether-substituted N-alkylaminoalkanesulfonate salts as new surface active compositions, (4) detergent compositions comprising a sodium, potassium or ammonium long-chain fatty acid soap and said ether-substituted N-alkylaminoalkanesulfonate salts, and (5) methods for increasing the lime soap dispersion efficiency of soap-containing detergent compositions by incorporating an ether-substituted N-alkylaminoalkanesulfonate salt therein.

I claim:
1. A substituted N-alkylaminoalkanesulfonate salt of the formula

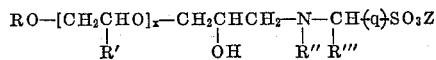

wherein R is a radical selected from the group consisting of alkyl and alkyl-substituted phenyl radicals having from 8 to 24 carbon atoms, R' is selected from the group consisting of lower alkyl radicals, chloromethyl radicals, and hydroxymethyl radicals when x is greater than 1, x is a whole number of from 1 to 10, R'' is an alkyl radical of from 1 to 4 carbon atoms, R''' is selected from the group consisting of hydrogen and alkyl radicals of from 1 to 2 carbon atoms, —q— is selected from the group consisting of —CH$_2$—, —CH$_2$CH$_2$—, —CH$_2$CH$_2$CH$_2$—, and —CH$_2$CH$_2$CH$_2$CH$_2$— when R''' is hydrogen, —q— is selected from the group consisting of —CH$_2$—, and —CH$_2$CH$_2$— when R''' is an alkyl radical of 1 carbon atom, —q— is —CH$_2$— when R''' is an alkyl radical of 2 carbon atoms, and Z is a salt forming cation selected from the group consisting of alkali metal, alkaline earth metal, and ammonium.

2. Sodium N-[3-(1-alkoxy-2-butoxy)-2-hydroxy-1-propyl]-N-methyl-2-aminoethanesulfonate wherein alkoxy is a mixture of hexadecyloxy and octadecyloxy radicals, of the formula

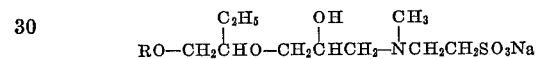

wherein RO— denotes the alkoxy radical.

3. Sodium N-{3-[1-(n-hexadecyloxy-2-propoxy)-2-propoxy] - 2 - hydroxy - 1 - propyl} - N - methyl - 2 - aminoethanesulfonate, of the formula

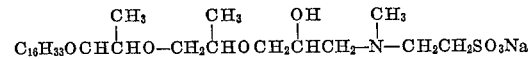

4. Sodium N-{3-[1-lauryloxy-3-chloro-2-propoxy)-3-chloro - 2 - propoxy] - 2 - hydroxy - 1 - propyl} - N - methyl-2-aminoethanesulfonate, of the formula

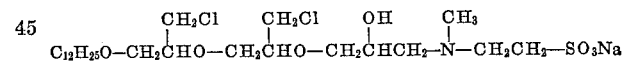

5. Sodium N-{3-[1-decyloxyhexa(2-propenoxy)]-2-hydroxy-1-propyl}-N-methyl-2-aminoethanesulfonate, of the formula

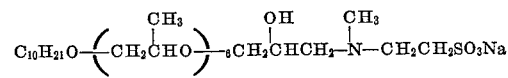

6. Sodium N - [3 - (1 - n - octadecyloxy - 3 - chloro-2 - propoxy) - 2 - hydroxy - 1 - propyl] - N - methyl - 2-aminoethanesulfonate, of the formula

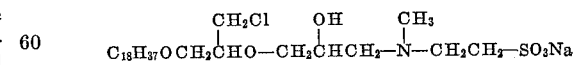

7. Sodium N-{3-[1-tridecyloxytri(3-chloro-2-propenoxy)] - 2 - hydroxy - 1 - propyl} - N - methyl - 2 - aminoethanesulfonate, of the formula

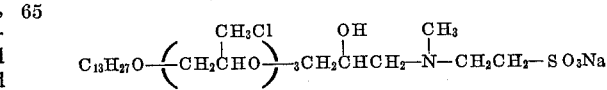

8. Sodium N - (3 - {1 - {1 - [1 - (dodecylphenoxy) - 2-butoxy - 2 - butoxy} - 2 - propoxy) - 2 - hydroxy - 1 - propyl)-N-methyl-2-aminoethanesulfonate, of the formula

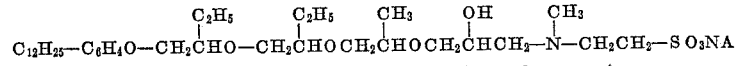

(References on following page)

References Cited by the Examiner
UNITED STATES PATENTS

| | | | |
|---|---|---|---|
| 2,668,851 | 2/54 | Eilar | 260—513 |
| 2,749,315 | 6/56 | Faier | 252—117 |
| 2,806,056 | 9/57 | Feichtinger | 260—513 |
| 2,817,675 | 12/57 | Hofer | 260—513 |
| 2,830,082 | 4/58 | Sexton et al. | 260—513 |
| 2,860,160 | 11/58 | Sundberg | 260—501 |
| 2,868,731 | 1/59 | Henderson et al. | 252—117 |
| 2,989,547 | 6/61 | Whyte | 260—513 |
| 3,102,893 | 9/63 | Gaertner | 260—348 |

LORRAINE A. WEINBERGER, *Primary Examiner.*

JULIUS GREENWALD, LEON ZITVER, *Examiners.*